United States Patent [19]

Erickson

[11] 4,316,198

[45] Feb. 16, 1982

[54] ELECTROGRAPHIC RECORDING

[75] Inventor: Roger D. Erickson, Denver, Colo.

[73] Assignee: Honeywell Inc., Minneapolis, Minn.

[21] Appl. No.: 152,599

[22] Filed: May 23, 1980

[51] Int. Cl.[3] ...................... G01D 15/06; G03G 15/09

[52] U.S. Cl. ................................ 346/150; 346/153.1; 118/658; 430/122

[58] Field of Search ................ 101/DIG. 5, DIG. 13; 118/647, 657, 658; 250/324, 325; 346/150, 153.1; 430/31, 39, 48, 122, 937; 355/300; 324/455, 457

[56] References Cited

U.S. PATENT DOCUMENTS

| | | | |
|---|---|---|---|
| 2,930,351 | 3/1960 | Giaimo, Jr. | 118/657 |
| 3,816,840 | 6/1974 | Kotz | 118/657 X |
| 3,879,737 | 4/1975 | Lunde | 346/153.1 |
| 3,909,258 | 9/1975 | Kotz | 430/31 X |
| 4,118,710 | 10/1978 | Tomita et al. | 118/647 X |
| 4,122,456 | 10/1978 | Berkowitz et al. | 118/657 X |

*Primary Examiner*—Aristotelis M. Psitos
*Attorney, Agent, or Firm*—Laurence J. Marhoefer; Lockwood D. Burton

[57] ABSTRACT

An electrographic recording system includes means wherein toner powder having electrical and magnetic properties is carried from a hopper to a recording station by a rotatable drum or shell. The shell is rotated about a magnetic core structure which produces a magnetic field to hold the toner powder onto the surface of the shell as it rotates. At the recording station, a dynamic bridge is formed of the toner powder between the periphery of the drum and a magnetically permeable member positioned a predetermined distance from the surface of the drum. A record member is driven along a path between the drum and the permeable member with the reverse side of the record member in contact with the permeable member. An array of recording electrodes are positioned to be in electrical contact with the toner powder in the bridge. The record member is backed up by an electrically conductive platen. When one or more of the electrodes is energized a conductive path is established from the electrode through the bridge to the surface of the recording member and the conductive backup plate, electrically charging the dielectric surface of the recording member to deposit toner thereon.

4 Claims, 2 Drawing Figures

FIG. 1
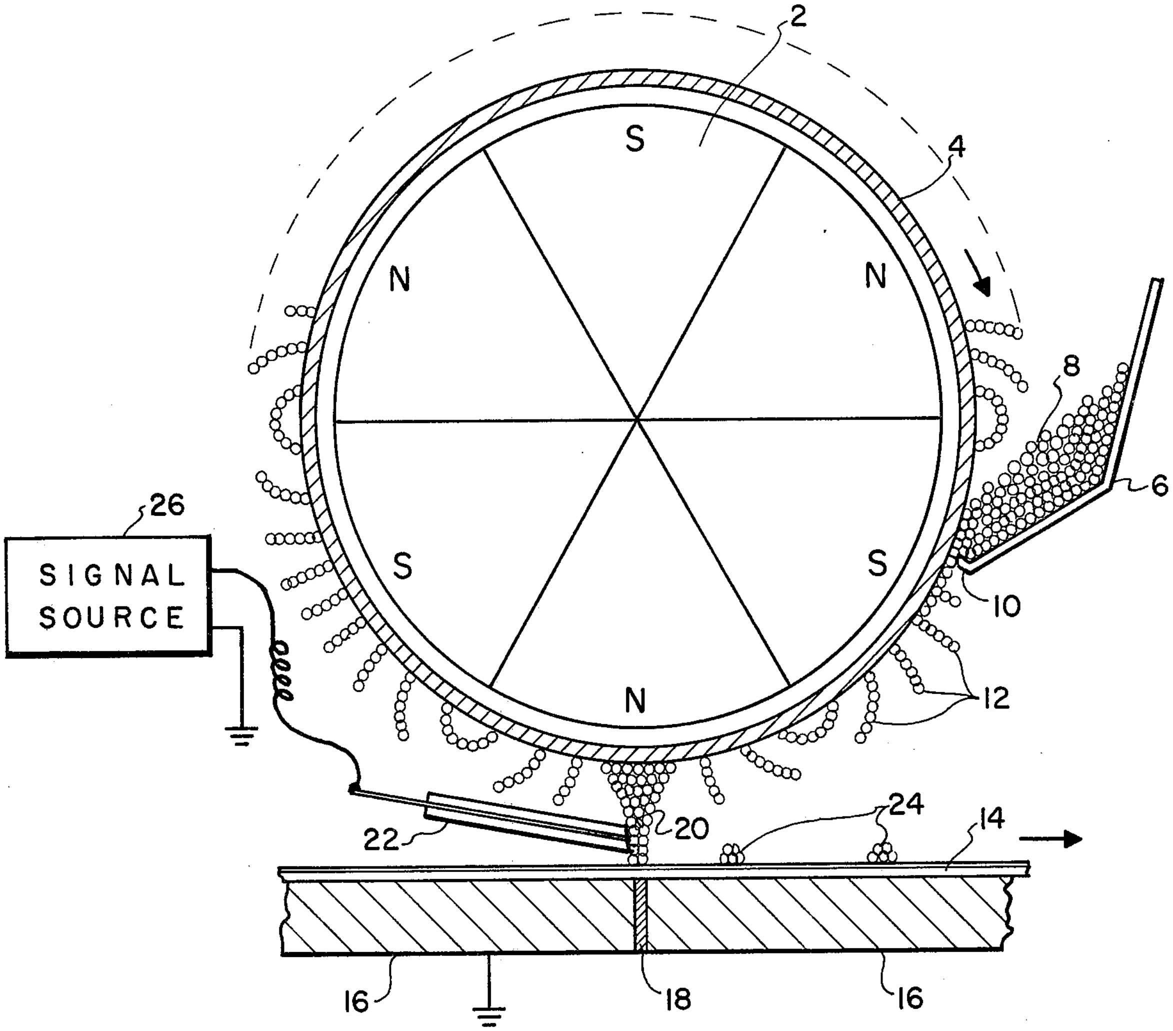
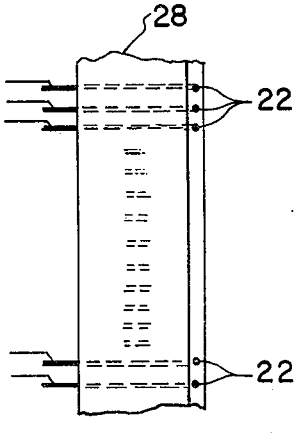
FIG. 2

ELECTROGRAPHIC RECORDING

BACKGROUND OF THE INVENTION

The present invention relates to electrographic recording. More particularly, it relates to an improved recording apparatus using electrographic techniques.

Heretofore there has been a well-established technology relating to a form of electrographic recording. In according with that technology, a latent electrostatic image is formed on a record carrier. The electrostatic image is then developed by the deposition of a colored toner thereon which adheres to the carrier in the pattern of the latent image. The toner image is then fixed as by heating or pressure to form a permanent record.

More recently, there has been developed an improved electrographic recording technology wherein the need for providing a latent electrostatic image is eliminated. That technology is illustrated in Kotz U.S. Pat. Nos. 3,816,840, Lunde 3,879,737, and Lunde 3,946,402. In accordance with the teachings in those patents, a quantity of toner powder which has both electrical and magnetic properties, is contained in a hopper positioned adjacent a drum made of non-magnetic material. Within the drum there is a magnet structure creating magnetic fields extending through the periphery of the surrounding drum. In one form of the structure disclosed the drum rotates about an axis coaxial with the central magnet structure while the magnetic core is fixed. In another form, the outer drum is stationary while the inner magnetic core is rotated. In either case, the toner powder is drawn from the hopper by the magnetic fields to be attracted to the outer periphery of the drum. The rotation of the drum or the magnetic core causes the toner particles to be translated around the periphery of the drum to a recording station.

At the recording station, a recording medium comprising a backing sheet such as paper having a dielectric coating thereon is driven along a path spaced a small distance from the surface of the toner bearing drum. An electrically conductive element is positioned on the opposite side of the record member from the drum. Under the influence of the magnetic fields, the toner particles form whisker like strings about the surface of the drum. These whisker strings are of sufficient length to brush the surface of the record member. Because of the magnetic fields, these toner particles are not deposited upon the surface of the record receiving member unless an electric field is established between the drum or electrodes carried by the drum and the backup conductive plate on the opposite side of the record member. When such electric fields are established the electrostatic charges over power the magnetic field influence and deposit the toner particles in selected areas on the record member in accordance with the pattern established by the electric fields.

In an analogous embodiment shown in the aforementioned patents, a somewhat different technique is employed in that the record member is uniformally coated with the toner powder and the unwanted portion of the toner powder is than picked off the magnetic field, the desired portion being adhered to the record member by the superposition of an electric field in the manner aforementioned. These improvements have thus provided a recording technique wherein records of data may be made without first imposing an electrostatic image on the record member which must then be developed by the toner. It is, in effect, a direct writing technique.

There are, however, certain disadvantages in the techniques described which have been observed. In the technique wherein the outer drum is held stationary and the inner magnetic core is rotated to produce the movement of the toner about the periphery of the drum, the speed of writing on the record member is limited by the rotational speed of the magnetic structure, it being necessary for a magnetic pole to be present at the writing station at the instant of pulsing the electrodes as is shown in U.S. Pat. No. 3,914,771—Lunde et al. In the technique wherein the recording medium is uniformly coated with the toner and the toner selectively removed by the conjoint operation of the electric and magnetic fields, it has been found that the background portion of the record thus produced is darkened by the residual toner not completely removed by the magnetic field. This produces a reduced contrast record. In the embodiment wherein the magnetic field is stationary and the outer drum is rotated, the signal electrodes must be those positioned on the reverse side of the record member. This arrangement has not been found to produce a satisfactorily sharp record.

SUMMARY OF THE INVENTION

It is, accordingly, an object of the present invention to provide an improved electrographic recording apparatus which obviates the shortcomings of the foregoing systems.

It is another object of the present invention to provide an improved electrographic recording system wherein a cleaner, sharper image is produced.

In accomplishing these and other objects, there has been provided, in accordance with the present invention, an electrographic recording system wherein toner powder having electrical and magnetic properties is carried from a hopper to a recording station by a rotatable drum or shell. The shell is rotated about a magnetic core structure which produces a magnetic field to hold the toner powder onto the surface of the shell as it rotates. At the recording station, a dynamic bridge is formed of the toner powder between the periphery of the drum and a magnetically permeable member positioned a predetermined distance from the surface of the drum. A record member is driven along a path between the drum and the permeable member with the reverse side of the record member in contact with the permeable member. An array of recording electrodes are positioned to be in electrical contact with the toner powder in the bridge. The record member is backed up by an electrically conductive platen. When one or more of the electrodes is energized, a conductive path is established from the electrode through the bridge to the surface of the recording member and the conductive backup plate electrically charging the dielectric surface of the recording member to deposit toner thereon.

BRIEF DESCRIPTION OF THE DRAWINGS

A better understanding of the present invention may be had from the following detailed description when read in the light of the accompanying drawings in which:

FIG. 1 is a cross-sectional view of apparatus embodying the present invention; and FIG. 2 is a top view of the electrode structure of the type shown in FIG. 1.

DETAILED DESCRIPTION

Referring now to the drawings in more detail, there is shown in FIG. 1 a recording system wherein a magnetic core structure 2 defines a plurality of alternate magnetic poles about the cylindrical periphery thereof. Surrounding the magnetic core structure is a cylindrical drum or shell 4 formed on non-conductive, non-magnetic material. The drum is arranged to be rotationally driven about the magnetic core structure by conventional means (not herein shown). A hopper 6 is positioned adjacent the periphery of the drum 4 and is coextensive therewith. The hopper contains a quantity of toner powder 8. The toner powder is both electronically conductive and magnetically responsive in the manner shown in the aforementioned patents. The magnetic field produced by the magnetic core structure 2 causes the magnetic toner particles 8 to be attracted to the surface of the drum 4. The lower edge 10 of the hopper structure 6, the edge adjacent the periphery of the drum 4, constitutes a doctor blade for metering a predetermined quantity of the toner onto the surface of the drum 4. As the toner is moved by the rotating drum past the position of the doctor blade 10, the toner forms whisker like strings 12 conforming to the pattern of the magnetic fields established by the magnetic core structure 2.

Positioned adjacent to but spaced from the outer periphery of the drum 4 is means for defining a path along which a record member 14 is drawn. The record member 14 is perferably in the form of a substrate carrier which is at least slightly electrically conductive on the surface of which is a dielectric coating. The means defining the path for the record member 14 is an a non-magnetic back plate or platen 16, preferably conductive. Embedded in the back plate 16 or sandwiched between two segments of the back plate 16 there is positioned a thin magnetically permeable strip 18. The stip 18 is positioned to be parallel to the axis of the drum 4 and with the narrow edge positioned at the point of nearest approach to the surface of the drum 4. This position is defined as the recording station. At least a portion of the back plate opposite the toner bridge must be conductive and make electrical contact with the recording medium opposite the toner bridge; this may be the magnetically permeable strip 18.

The presence of the magnetically permeable strip 18 causes a sharply defined concentration of the magnetic field produced by the magnetic core structure 2 in the space between the drum 4 and the member 18. Since the whisker like strings of the toner particles 12 substantially conform to the pattern of the magnetic field, a highly concentrated sharply defined toner bridge 20 is defined extending between the periphery of the drum 4 and the upper surface of the record member 14. So long as the drum 4 continues to rotate, magnetic toner particles are constantly being added to and removed from the bridge 20 while the bridge 20 itself remains stably in position. This is herein referred to as a dynamic bridge. The toner particles removed from the bridge form the string whiskers 12 on the opposite side of the bridge and continued around the drum until they rejoin the toner 8 in the hopper 6. As the record member 14 is drawn past the end of the bridge 20, the toner particles in the bridge brush across the surface of the record member but substantially none of the toner particles are deposited on the surface of the record member since the magnetic field maintains a control in the attraction of the toner particles.

In order to effect a recording of data on the record member, an array of conductive electrodes 22 are positioned in the space between the drum 4 and the surface of the record member 14. The electrodes are positioned to intercept and have at least the extremities thereof in physical and electrically contact with the toner in the bridge 20. When an electrical pulse is applied to one or more of the electrodes 22, an electrical charge passes from the electrodes down through the toner bridge to the dielectric surface of the record member 14. That pulse results in an electrostatic charge being placed on the dielectric surface of the record member 14. The electrostatic charge overcomes the magnetic attraction of the particles and causes a deposit 24 of the toner particles on the surface of the record member 14.

In the illustracted embodiment, a signal source means 26 is shown with one lead connected to one of the electrodes 22 and the other lead grounded. The electrically conductive portion of the back plate 16 is also grounded. Thus a signal applied to the electrode 22 from the signal source 26 and through the bridge 20 effectively charges the dielectric surface of the record member 14, the opposite charge being applied through the grounded backing plate 16 and the conductive backing of the record member 14.

In FIG. 2 there is illustrated one embodiment of the array of electrode structures. There it may be seen that a plurality of wires or electrodes 22 are arranged in close parallel array and supported in position by an insulating block 28. The insulating block 28 maintains the electrode wires 22 in electrical isolation from each other. The leading edge of the block 22 is milled at an angle to expose the tips of the electrodes 22 for electrical engagement with the toner particles in the bridge 20. This arrangement maintains the stability of the positioning of the electrodes, or styli 22 while allowing them to positively electrically engage the toner particles of the bridge 20.

With the electrodes or styli 22 placed in the space between the drum 4 and the surface of the recording record member 14, there is provided a system wherein the uniform distribution of toner effected by the rotational drum and stationary magnetic field is obtained while retaining the resolution and sharpness of image of the fixed position electrodes on the same side of the record member as the toner bridge. The present system also offers the advantages of a cleaner background area of the record member not obtainable with the precoated record technique. Additionally recording at a higher linear speed of the record member is obtainable by virtue of the fixed magnetic pole structure than is obtainable with the rotational magnetic pole. The shell 4, shown as a drum, could be a flexible belt which conforms to the shape of the magnet structure.

Thus, there has been provided in accordance with the present invention an improved electrographic recording apparatus which overcomes the shortcomings of the earlier types of structure.

The embodiments of the invention in which an exclusive property or privilege is claimed are defined as follows:

1. An electrographic recording system for recording on a first surface of an electrographic recording medium, said system comprising:

a non-magnetic, back-up platen positioned to engage the opposite surface of said recording medium;

a multipolar magnetic structure, said magnetic structure being fixed in position;

a non-magnetic electrically non-conductive shell surrounding said magnetic structure, and mounted for rotary motion about said magnetic structure;

said shell being spaced a predetermined small distance above the plane of the surface of said recording medium;

hopper means for toner particles positioned adjacent the periphery of said shell to enable toner particles to be drawn from said hopper means onto said shell by magnetic fields produced by said magnetic structure;

a magnetically permeable strip member positioned in juxtaposition with portions of said back-up platen, to extend along a line coextensive with said shell and parallel to the axis thereof at a position defining a recording station, said magnetically permeable strip forming a concentration of a magnetic field produced by said magnetic structure and forming a dynamic bridge of said toner particles between said drum and said first surface of said recording medium at said recording station;

a portion of the back-up plate being electrically conductive and positioned to electrically engage the surface of the recording medium opposite said toner bridge; and an array of recording electrodes positioned in the space between the periphery of said shell and said recording medium with at least the extremities of said recording electrodes in electrical contact with said toner particles in said bridge at said recording station.

2. An electrographic recording system as set forth in claim 1 wherein said recording electrodes are electrically conductive and non-magnetic.

3. An electrographic recording system as set forth in claim 1 and including signal source means for selectively applying pulse signals to individual ones of said electrodes to impart electric charge patterns on said recording medium through said toner bridge and in cooperation with said electrically conductive portion of said back-up platen thereby to deposit toner particles on said record member from said bridge in accordance with said charge patterns.

4. An electrographic recording system for recording information on an electrographic recording medium comprising:

a non-magnetic platen over which said recording medium passes;

a multi-polar magnetic structure;

a non-magnetic electrically non-conductive shell;

means mounting said shell for motion about said magnetic structure with the peripheral surface of said shell spaced a small predetermined distance above said platen;

means for supplying magnetic toner particles to said shell;

a magnetically permeable member positioned substantially in the plane of said platen and extending parallel to the rotational axis of said shell defining a recording station, said magnetically permeable member concentrating the magnetic field produced by said magnetic structure to form a dynamic bridge of toner particles between said shell and said recording medium at said recording station;

a portion of said platen being electrically conductive;

an array of recording electrodes spaced between the peripheral surface of said shell and said platen with the extremities of said electrodes positioned to conduct electrical energy to said toner particles in said bridge at said recording station.

* * * * *